E. A. HEMSTEGER.
NUT LOCK.
APPLICATION FILED JUNE 25, 1908.
901,810.
Patented Oct. 20, 1908.
Fig. 1.
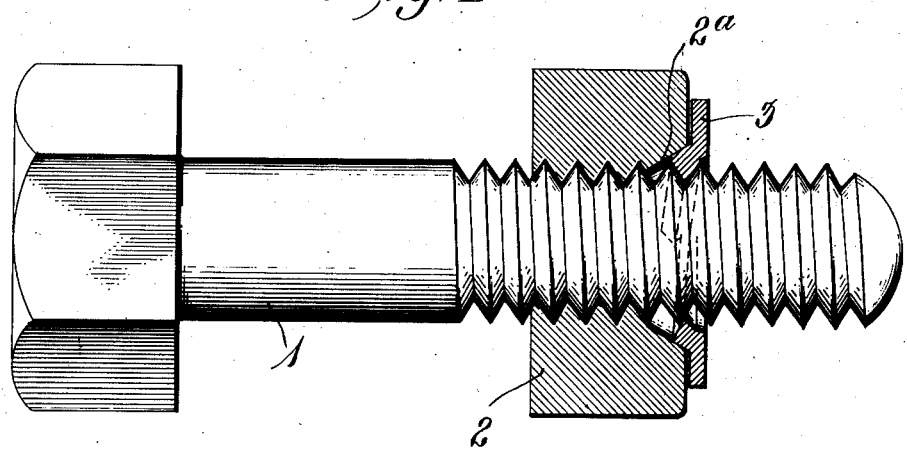
Fig. 2.
Fig. 3.
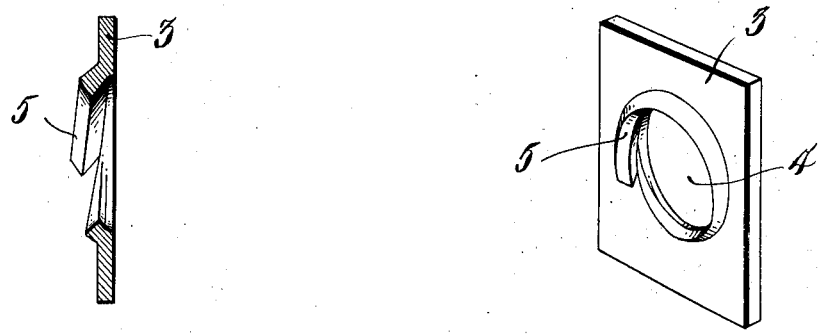
Witnesses
C. E. Smith.
S. E. Dodge.
Inventor
E. A. Hemsteger,
By Beeler & Robb
Attorneys

UNITED STATES PATENT OFFICE.

EDWARD A. HEMSTEGER, OF CHICAGO, ILLINOIS.

NUT-LOCK.

No. 901,810.  Specification of Letters Patent.  Patented Oct. 20, 1908.

Application filed June 25, 1908. Serial No. 440,375.

*To all whom it may concern:*

Be it known that I, EDWARD A. HEMSTEGER, a citizen of the United States, residing at Chicago, in the county of Cook and State of Illinois, have invented certain new and useful Improvements in Nut-Locks, of which the following is a specification.

This invention consists of a nut lock the principle of operation of which is similar to that shown and described by the United States Patent No. 527,569, dated October 16, 1894.

The object of the invention is to provide a device of the above class which is extremely simple in construction and therefore cheap to manufacture, and in which the locking principle of the nut locking means in the patent above referred to is carried out in a more practical device and one which more fully answers commercial purposes.

For a full understanding of the invention, reference is to be had to the following detail description and to the accompanying drawings, in which Figure 1 is a vertical longitudinal sectional view showing the invention applied; Fig. 2 is a transverse section of the nut locking member bringing out more clearly the sectional formation of the bolt and nut engaging flange; Fig. 3 is a detail perspective view of the nut locking member.

Throughout the following detail description and on the several figures of the drawings similar parts are referred to by like reference characters.

It is contemplated in the practical embodiment of the present invention to employ a special form of nut in conjunction with a peculiar locking member for preventing displacement thereof from the bolt. In the drawings the numeral 1 designates the bolt which is provided with the usual threaded end upon which the nut 2 is adapted to screw in the customary manner. The nut 2 is provided with the usual threaded opening, the latter, however, being enlarged, flared, or formed with a chamfer 2ª at its outer end. This chamfer 2ª is a necessary and important element of the construction of the nut, as will appear more clearly hereinafter.

To prevent displacement of the nut 2 a locking member 3 is employed and the latter preferably consists of a plate of many sided form, and of a thickness suitable for the purpose desired, said plate 3 being provided with a bolt receiving opening 4. At the opening 4 in the locking member 3 the latter is formed with a locking flange 5 of peculiar formation. This flange 5 is integral with the member 3 and is of spiral formation at the same time projecting outwardly from one side of the locking member. The locking flange 5 is so formed that it is readily adapted to engage the threads of the bolt 1 and by turning the locking member the latter may be caused to move longitudinally of the bolt in a manner similar to the adjustment of the nut. The flange 5 is of somewhat triangular formation in cross section and its innermost portion forms a spiral cutting or biting edge, while its outer edge inclines outwardly. At its outermost end the flange 5 ends abruptly and at the point of its beginning its outer surface is smooth and performs the functions of a cam in coöperation with the nut 2. In other words the flange gradually increases in size in cross section from its point of beginning to the abrupt end thereof, and its larger portion is adapted to give under tension to subserve the jamming or locking effect of the device in action.

Describing the operation of the invention, the nut 2 having been screwed upon the bolt 1 in the customary way, the locking member 3 is disposed upon the bolt and screwed toward the outer side of the nut. As the locking member approaches the nut in the adjustment above referred to the flange 5 enters the triangular space between the chamfer portion 2ª of the nut and the bolt, and the spiral formation of the flange causes the latter to act as a cam when the member 3 is rotated, the outer surface of the flange operating in contact with the chamfer 2ª while the inner edge of the flange is caused to bite into the threaded portion of the bolt 1. The frictional engagement of the outer surface of the flange 5 with the chamfer 2ª of the nut 2 and the biting action of the inner edge of the flange against the threaded portion of the bolt 1 are effective in securing the nut from displacement.

The present invention embodies in a single integral structure the locking principle of the device of the patent above referred to and does not necessitate the use of any special tool or operating member in the actual operation thereof.

It will be apparent that the nut locking member 3 may be readily removed whenever desired, that a tool may be readily applied to the member direct in placing the same in operative position, and that the member 3 may be made in different sizes and of different forms so that it embodies the special features of construction which have been before described as suitable and essential features of the present invention.

Having thus described the invention, what is claimed as new, is:

As a new article of manufacture, a nut lock consisting of a plate provided with an opening adapted to receive a bolt, said plate having a spiral thread engaging flange of triangular cross section projecting outwardly from a side thereof and substantially concentric with reference to the bolt opening aforesaid, the flange increasing in size from its point of beginning to an abrupt terminal point substantially at said point of beginning and at the same time inclining outwardly from its point of beginning to its abrupt extremity above mentioned.

In testimony whereof I affix my signature in presence of two witnesses.

EDWARD A. HEMSTEGER.

Witnesses:
W. VETTER,
C. S. EVERETT.